United States Patent [19]

Wappler

[11] 4,111,316

[45] Sep. 5, 1978

[54] TRUCK MOUNTED HOIST

[76] Inventor: Joachim Harold Richard Wappler, 317 Kenollie Rd., Mississauga, Canada

[21] Appl. No.: 786,281

[22] Filed: Apr. 11, 1977

[30] Foreign Application Priority Data

Apr. 13, 1976 [CA] Canada .................................. 250198

[51] Int. Cl.$^{2}$ ................................................ B60P 1/54

[52] U.S. Cl. .................................. 214/75 H; 212/145

[58] Field of Search ...................... 214/75 H, 132, 151; 212/66, 67, 68, 69, 145

[56] References Cited

U.S. PATENT DOCUMENTS

| | | | |
|---|---|---|---|
| 2,794,557 | 6/1957 | Vero | 214/75 H |
| 2,796,998 | 6/1957 | Sundin | 212/66 |
| 2,804,216 | 8/1957 | Farnam | 214/75 H |
| 3,082,889 | 3/1963 | Bopp | 214/75 H |
| 3,738,500 | 6/1973 | Coleman et al. | 212/66 |
| 3,918,742 | 11/1975 | Garbler et al. | 214/75 H |

*Primary Examiner*—Lawrence J. Oresky

[57] ABSTRACT

Hoist apparatus of the type adapted to be mounted on a truck adjacent the truck bed, leaving the truck bed clear, for use in unloading or loading the truck or the like, and comprising a boom, hoist means on said boom, a vertical support column, said boom being mounted on the upper end of said column, and said support column being rotatably mounted for rotating said boom, drive gear means located adjacent the lower end of said support column, rack means meshing with said drive gear means, guide means for guiding movement of said rack to and fro relative to said drive gear, housing means supporting said vertical column, and at least partially embracing said drive gear and supporting said guide means, and, power operated means connected with said rack, and mounted on said housing, for driving said rack to and fro.

3 Claims, 6 Drawing Figures

TRUCK MOUNTED HOIST

The present invention relates to hoists or cranes of the type mounted on a truck body, for loading or unloading the truck, and in particular to an improved rotation means for rotating the vertical support column which supports the boom of the crane or hoist.

BACKGROUND OF THE INVENTION

A typical truck mounted crane or hoist, of the general class to which the invention relates, is shown in U.S. Pat. No. 3,082,889. Typically, such hoist will have a boom which may be of a fixed length or may be telescopic, mounted on top of a vertical post or column. The bottom end of the post or column will be mounted on or below the truck bed. Typically, some form of rotation mechanism is provided for rotating the column to swing the boom into the desired position. In the past, such rotation mechanism has usually incorporated some form of sprocket attached to the bottom end of the vertical column, and operated by means of a chain drive. The chain may be moved to and fro by means such as for example two hydraulic cylinders one at each end of the chain. Such a system is reasonably effective. However, it suffers from serious disadvantages.

It is desirable that hoists of this type may be made according to a standard design and then attached to various different makes of truck body, depending upon the customers requirements and choice.

The use of a chain and two hydraulic cylinders means that the two hydraulic must be attached on to the truck frame, or to the underside of the truck bed. Some form of attachment means must be provided which must be located precisely in relation to the position of the sprocket. Since there are wide variations in the design of truck bodies, it is thus necessary to have a variety of different attachment means. In addition, this factor also leads to problems in servicing, since the truck body may flex or move consequently changing the relationship between the chain and the sprocket. From all of these viewpoints it is therefore desirable that the entire hoist and rotation mechanism shall be built as far as possible as a single unit, which may then be attached to any suitable position on the truck body, without the requirement of different mounting means for different truck bodies.

In addition to these factors, it has also been found necessary to provide stabilizing legs which are extendable on opposite sides of the truck body so as to prevent the truck body from being tipped over by heavy loads carried on the boom. Typically stabilizing legs in the past have been attached to the truck bed as a separate attachment. They are usualy swingable in a vertical plane, and operated by hydraulic cylinders so that they may be swung upwardly out of the way or downwardly into contact with the ground. Again, the separate attachment of the stabilizing legs requires special engineering for a variety of different types of truck beds. It is therefore desirable that the stabilizing legs shall be incorporated in the design of the hoist itself so that the entire unit consisting of the hoist boom vertical column and stabilizing legs may be attached to the truck bed as a single integral unit. In addition, in this way it is possible for the stabilizing legs to actually stabilize the support of the vertical column of the hoist itself. In this way, there are no twisting stresses applied through the truck frame or truck bed between the location of the hoist on the one hand, and the location of the stabilizing legs on the other.

BRIEF SUMMARY OF THE INVENTION

The invention therefore seeks to overcome the foregoing disadvantages by the provision of hoist apparatus of the type adapted to be mounted on a truck adjacent the truck bed, leaving the truck bed clear, for use in unloading or loading the truck or the like, and comprising a boom, hoist means on said boom, a vertical support column, said boom being mounted on the upper end of said column, and said support column being rotateably mounted for rotating said boom, drive gear means located adjacent the lower end of said support column, rack means meshing with said drive gear means, guide means for guiding movement of said rack to and fro relative to said drive gear, housing means supporting said vertical column, and at least partially embracing said drive gear and supporting said guide means, and, power operated means connected with said rack, and mounted on said housing, for driving said rack to and fro.

It is a further and related objective of the invention to provide a hoist apparatus having the foregoing advantages and in which the housing incorporates universal mounting means for attachment to the rear end of a truck body, and being inherently adapted to suit a wide variety of different truck bodies without modification.

It is a further and related objective of the invention to provide hoist apparatus having the foregoing advantages in which the power operated means comprises two power cylinders preferably hydraulic cylinders, attached to the housing, and coupled to opposite ends of the rack means.

It is a further and related objective of the invention to provide hoist apparatus having the foregoing advantages incorporating stabilizing leg means attached to the hoist apparatus and providing direct support for the vertical support column, and operable between raised inactive positions, and extended supporting positions by any suitable power operated means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

In the drawings.

Figure 1:
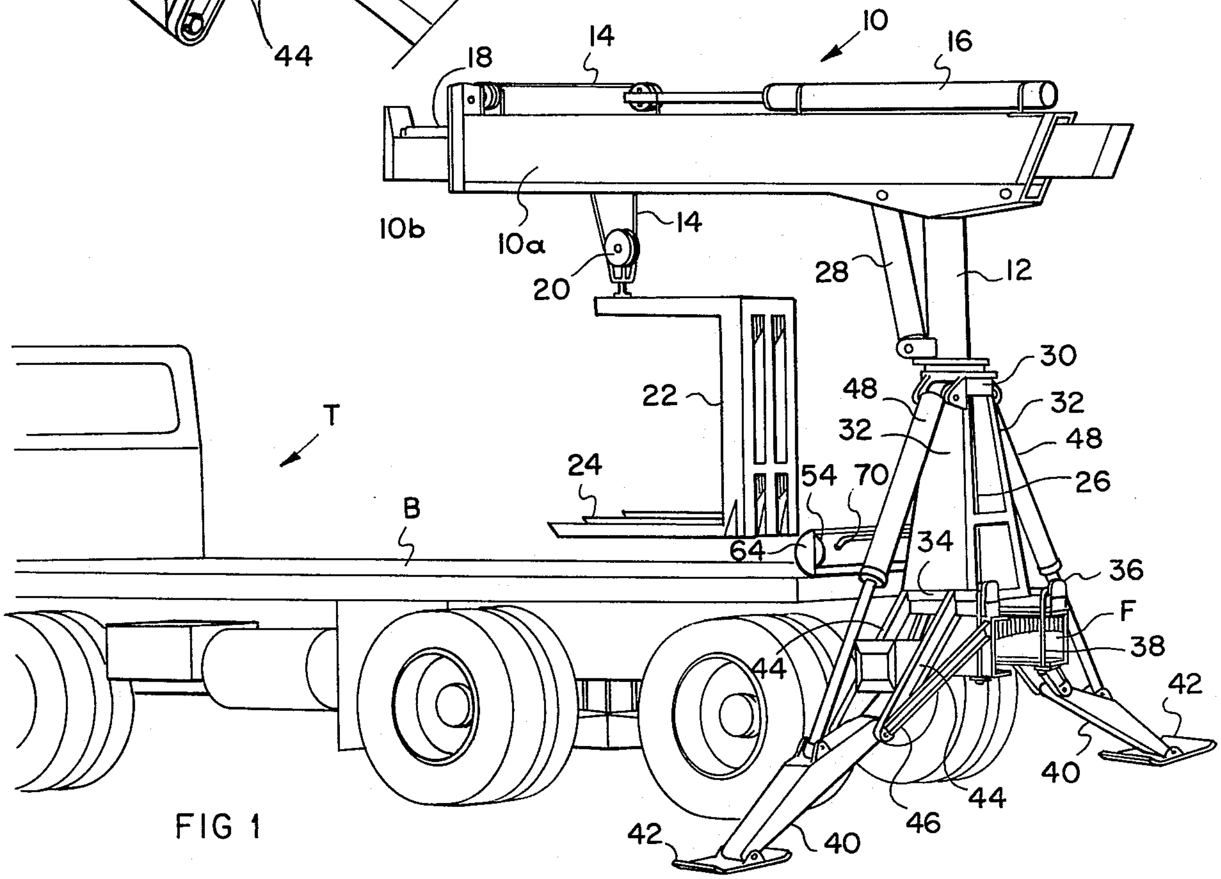
FIG. 1 is a perspective illustration showing a truck with a hoist mounted thereon.

Referring initially to FIG. 1, it will be seen that the truck shown as T has a truck bed B for carrying a load. Typically, the truck bed will be flat, and will be suitable for carrying a wide variety of loads typically bricks, blocks or other heavy construction components, and typically being loaded on pallets or the like.

Loading and unloading of these heavy items from the truck bed requires power operated hoist means, and for ease of handling trucks of this type are frequently provided with a hoist such as the hoist shown in FIG. 1. The hoist will be seen to comprise a boom 10 mounted on a vertical support column 12. The boom 10 will usually incorporate some form of hoist apparatus having a hoist cable 14, and provided with power operated means for shortening and lengthening the cable. Such means may be in the form of a drum (not shown) or may be in the form of an hydraulic cylinder 16 or any other suitable means which may be provided.

The boom 10 may be formed of telescopic sections 10a, 10b etc., so that it may be used for off loading at for example a building site where the load is required to be deposited at some distance from the truck. The telescopic sections 10a, 10b etc., will be provided with any suitable power operated means for extending and retracting the sections. The extended position is not shown, but a portion of the extension mechanism, comprising a hydraulic cylinder (not shown) and operating shaft indicated as 18 are shown in FIG. 1. The hoisting cable may simply have a free end provided with a hook, or may alternatively be doubled over a pulley 20 which is itself provided with a hook, or for example a three sided hoisting bracket 22 having tines 24 for extending under a typical pallet.

The vertical support column 12 according to this preferred embodiment of the invention is mounted at its lower end in a housing 26, and is rotatable about its vertical axis so as to swing the boom 10 to and fro on either side of the truck.

Provision may also be made for swinging the boom 10 upwardly and downwardly. Typically, if such provision is required it will be by means of for example hydraulic cylinder 28 mounted between the boom 10 and the vertical support column 12, at some point just above the housing 26.

The vertical support column 12 extends completely through the housing 26. Housing 26 will preferably be provided with any suitable bushings or the like within the interior thereof (not shown) for example at the locations of the enlarged collars 30 at the upper and lower ends of the housing 26. In this way the support column 12 may be rotated within the housing 26, which itself remains permanently fixed to the truck. In order to support the housing 26 in the vertical orientation as shown, a pair of A frame support bars 32 are provided, being welded at their upper ends to the housing 26 as shown, and extending downwardly and outwardly in the form of a letter A. At their lower ends they are welded to a horizontal base plate 34. Attachment lug members 36 are attached to the four corners of the plate 34 extending forwardly and backwardly. They are attached to any suitable portions of the truck such as the frame F by means of the U-bolts 38.

In order to stabilize the hoist, and the truck, when the boom is swung outwardly to one side or the other with a heavy load thereon, stabilizing legs 40 are provided, having ground engaging feet 42 at the free ends thereof. The inner ends of the legs 40 are pivotally mounted between a pair of attachment brackets 44. The inner ends of the brackets 44 are welded to the frame member F of the truck thus stabilizing both the position of the hoist itself and also the truck. Additional bracing struts 46 may be welded between the free ends of the bracket 44 and the ends of the frame members S of the truck as shown in FIG. 1.

The legs 40 are swung upwardly and downwardly by any suitable power operated means, in this case the hydraulic cylinders 48. The hydraulic cylinders 48 extend between the upper end of the housing 26, where they are swingably mounted, to a point approximately mid-way along the legs 40.

It will of course be appreciated that all of the power operated means referred to herein, which in the case of this embodiment consist of hydraulic cylinders such as 16, 18, 28, and 48 will all be provided with suitable hydraulic pressure hose connections (not shown) and control valves (not shown) by means of which hydraulic pressure from a suitable pump or source (not shown) carried on the truck may be applied to the various cylinders for the various purposes concerned. All of these features are very well known in the art and require no description and are consequently shown only schematically in FIG. 6.

Figure 2:
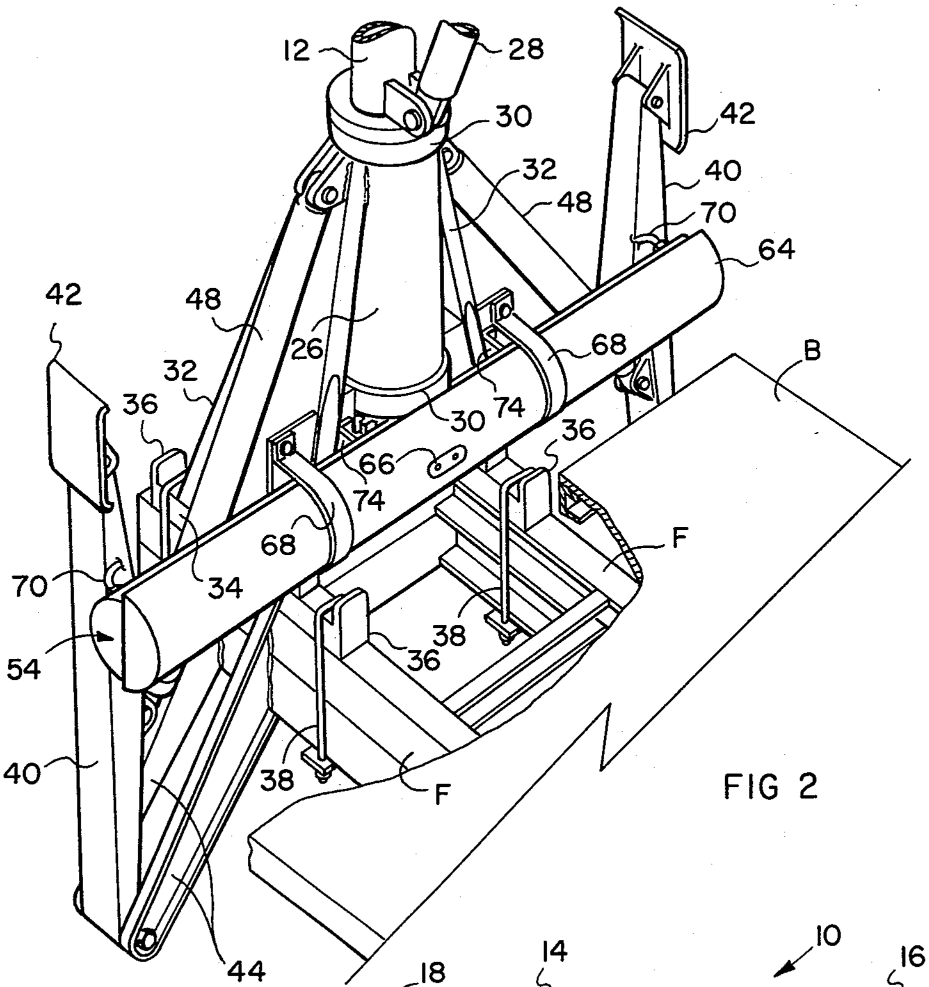
FIG. 2 is an enlarged perspective illustration partially cut away, showing the rotational apparatus and vertical support column of the hoist according to the invention.
Figure 3:
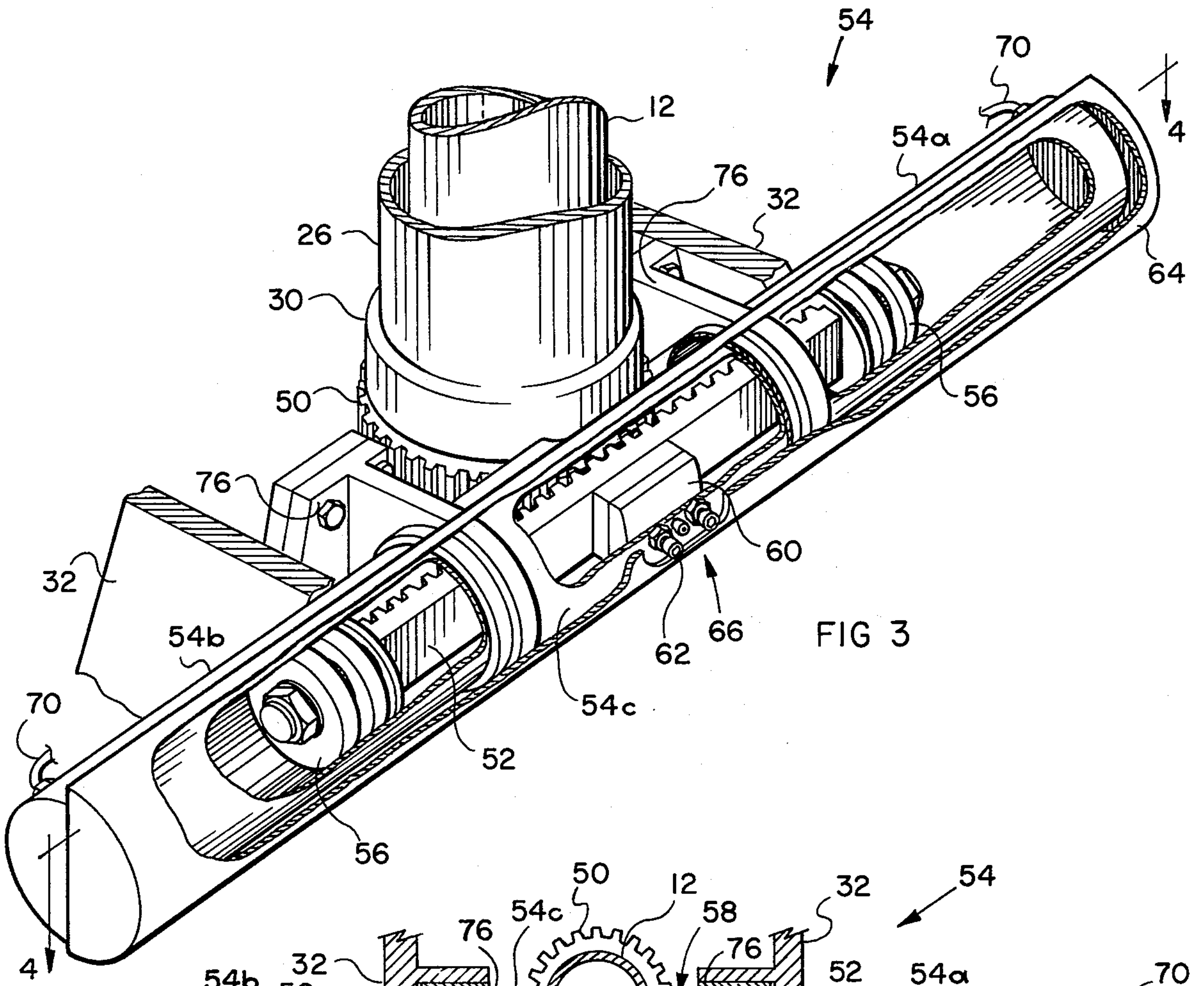
FIG. 3 is cut away perspective of part of FIG. 2.
Figure 4:
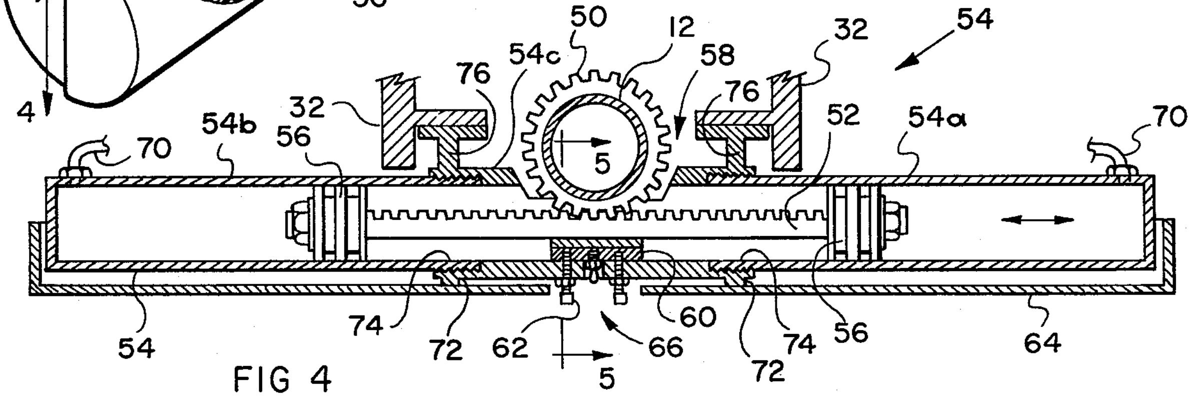
FIG. 4 is a section along the line 4—4 of FIG. 3.
Figure 5:
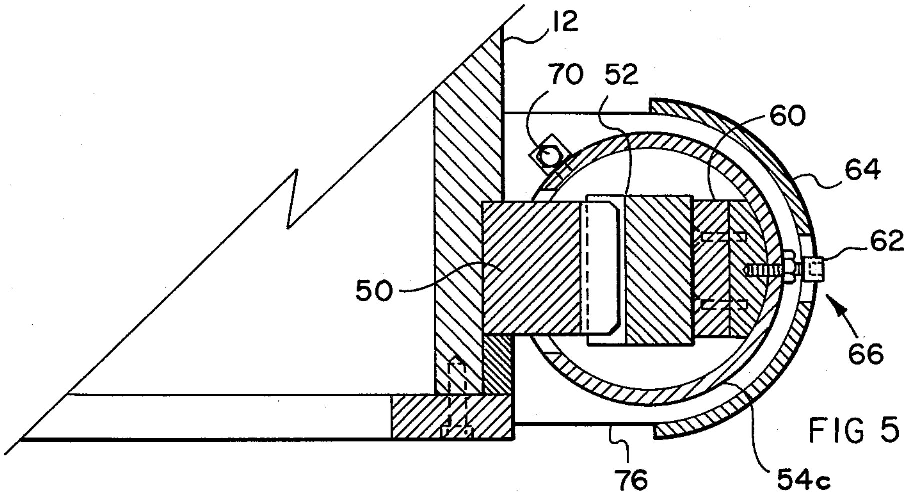
FIG. 5 is a section along the line 5—5 of FIG. 4.

In order to rotate the column 12, so as to swing the boom 10 to one side or the other of the truck, there is provided a drive gear 50 at the lower end of the column 12. The gear 50 consists essentially of a toothed ring extending around the column 12 as shown in FIG. 3, and 4. In order to drive the gear 50, there is provided a rack member 52. The rack member 52 is slideably carried within a double ended cylinder 54. At each end of the rack 52 there is provided a suitable piston 56 fitting snugly within the cylinder 54. At the centre of the cylinder 54 a portion of the side wall is cut out to provide a window 58 thereby permitting the drive gear 50 to enter the cylinder 54 and be engaged by the rack 52 as shown in FIG. 4, and 5. A pressure pad 60 is provided within the cylinder 54 to apply pressure to the smooth side of the rack 52 so as to hold the toothed side in engagement with the gear 50. The pad 60 may be of two part construction, the facing being made of any suitable bushing material such as bronze, or some other self lubricating material for example so as to provide an extended life, and at the same time to permit replacement of the wearing surface during servicing. Preferably, there will be provided a pair of adjustment bolts 62 whereby the pad 60 may be adjusted to the correct position, and take up any wear which may arise between servicing. The cylinder 54 is partially protected within a protective shield member 64 and the shield 64 is preferably provided with a window 66 to give access to the adjustment bolts 62. The shield member is semi-cylindrical and will be held in position by releasable means such as the straps 68 (see FIG. 2).

Any suitable power source may be used to drive the rack 52 to and fro so as to rotate the drive gear 50. In the case of this embodiment of the invention however use is also made of hydraulic pressure. For this purpose, each end of the cylinder 54 is employed as a hydraulic pressure cylinder. It is thus provided with hydraulic pressure pipes or hoses 70 one at each end, each end of the cylinder 54 being otherwise closed and sealed. The pistons 56 at each end of the racks 52 are adapted to seal against the hydraulic fluid. The hoses or pipes 70 will communicate through any suitable control valve system (not shown) with a source of hydraulic fluid pressure. By the operation of a suitable valve system (see FIG. 6) hydraulic fluid may be admitted under pressure through the hose or coupling 70 at one end of the cylinder 54, while the hydraulic fluid is released through the hose or coupling 70 at the other end of the cylinder 54. In this way, the rack 52, and the two pistons 56, operating within the common cylinder 54 constitute essentially a double acting hydraulic power system, with the rack 52 itself constituting the operating rod of the conventional cylinder.

As best shown in FIG. 4, the cylinder 54 is made up of two substantial identical cylinder end portions 54*a* and 54*b*, and a central mounting portion 54*c*. The central portion 54*c* is essentially an open ended cylinder, being provided at each end with a female threaded counter bore 72, for receiving the threaded ends 74 of the end cylinder portions 54*a* and 54*b*.

In this way, servicing of the cylinder 54 is greatly simplified.

The central portion 54*c* is provided with a pair of mounting flanges 76 which may be bolted directly to the frame members 32.

In this way, servicing of the entire sub-assembly constituting the cylinder 54 and the rack can be achieved simply by removing the bolts attaching the flanges 76 to the frame 32.

Figure 6:
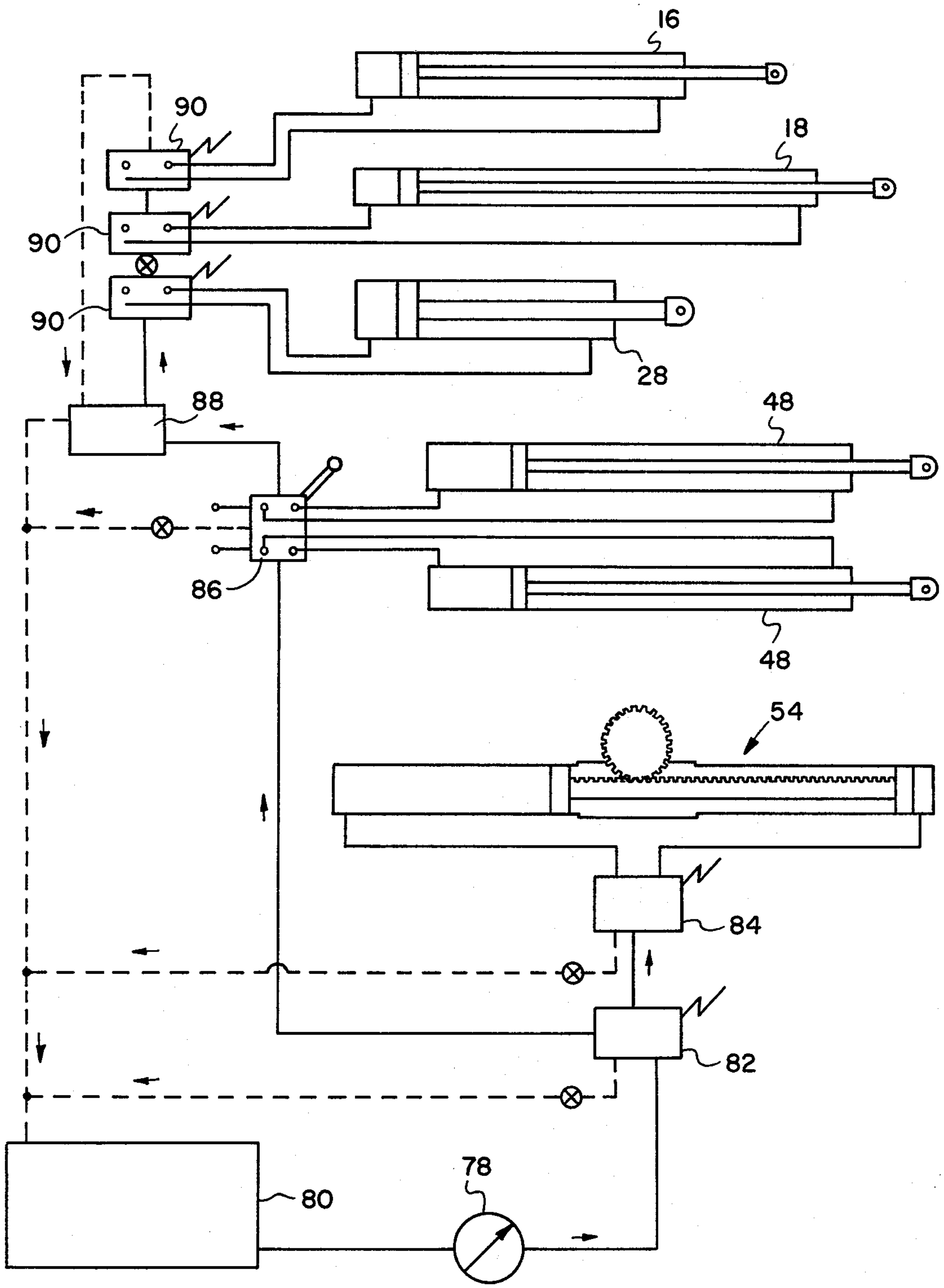
FIG. 6 is a schematic drawing of the hydraulics.

As shown schematically in FIG. 6, the entire system is hydraulically powered and controlled. A pump 78 is supplied from a reservoir or tank 80. The hydraulic medium, from the pump 78 is passed through a flow divider 82. A portion of the flow supplies the cylinder 54, through the electrically operated valve 84.

A further portion of the flow operates the stabilizers cylinders 48, through the control valve 86.

A rotatable coupling 88 supplies hydraulic medium to the control valves 90 which then control the cylinders 16, 18 and 28.

The operation of the apparatus is self evident. A load may be attached to the fork or lifting device on the boom, and the boom may be raised upwardly, and the cable may be extended or hoisted, and the boom may be extended or retracted, simply by the operation of the valves above noted. When it is desired to swing the boom to one side or the other of the truck, then by the operation of the valve 84, hydraulic pressure medium is applied to either one end or the other of cylinder 54 thereby causing the rack to move and rotating the toothed ring gear 50. This in turn rotates the column 12 to which the boom is attached.

Depending upon the nature of the loads to be carried on the boom, the stabilizing legs will of course first of all have been extended outwardly if required.

The foregoing is a description of a preferred embodiment of the invention which is given here by way of example only. The invention is not to be taken as limited so any of the specific features as described but comprehends all such variations thereof as come within the scope of the appended claims.

I claim:

1. Hoist apparatus of the type adapted to be mounted on a truck adjacent the truck bed, leaving the truck bed clear, for use in unloading or loading the truck or the like, and comprising;

boom means;

hoist means on said boom means;

a vertical support column, said boom means being swingably mounted on the upper end of said column, and said support column being rotatably mounted for rotating said boom means and said column in unison;

drive gear means located adjacent the lower end of a said support column for rotating the same;

rack means meshing with said drive gear means and moveable to and fro along a linear path relative to said drive gear;

a non-rotatable vertically oriented housing means supporting and enclosing a portion of said vertical column and said gear means adapted for mounting in fixed position on a portion of said truck, and supporting said vertical column along a substantial portion of its length;

power operated means connected with said rack means, and mounted on said housing, for driving said rack means to and fro thereby rotating said support column and said boom means in unison on either side of said truck bed further said power operated means includes a cylinder means; a protective shield member covering a portion of said power operated means, said shield member being in the shape of a shell having a semi-circular cross section and covered at each end by a plate having the shape of a half circle such that the plane of the open portion of said shield member bisects said cylinder means along its longitudinal axis, said rack means comprises an elongated linear rack member having tooth means on one side, adapted to engage said drive gear means, the other side of said rack member being flat and smooth, said rack member being located within said cylinder means and moving along a predetermined linear reciprocal path to and fro there-within, and including a pressure pad located within said cylinder means and engaging said flat, smooth side of said rack member for holding the same with said tooth means in engagement with said drive gear means, said pad having a substantially rectangular contact surface with said flat, smooth side of said rack member, and adjustment means including two adjustable threaded means for adjustment of the pressure applied by said pressure pad on said rack member, further said protective shield member having an opening to permit access to said adjustment means;

supporting frame members forming part of said housing means for supporting vertical column, and extending from a lower portion of said housing means at an angle downwardly on opposite sides thereof;

ground engaging strut means swingably attached to the lower outer ends of said frame members, and, power cylinder means extending between the upper end of said housing means above said frame means and respective said strut means, operation of said power cylinder means swinging said strut means between upwardly angled disengaged positions and downwardly angled ground engaging positions, said power cylinder means thereby directly supporting and stabilizing the upper end of said vertical housing and said column enclosed therein against heavy loads applied at the end of said boom means, when said boom means are swung outwardly on one or other side of said truck.

2. Hoist apparatus as claimed in claim 1 including attachment lug means on said housing means and extending forwardly and rearwardly therefrom, whereby the same may be secured both in front of and behind said housing means lengthwise along the frame of a truck adjacent the truck bed thereby leaving the truck bed clear for loading and unloading as aforesaid.

3. Hoist apparatus as claimed in claim 1 wherein said cylinder means comprises a central cylinder portion, an opening in one side thereof providing the aforesaid opening means, each end of said cylinder portion being open, threaded connection means on both said open ends, a pair of hydraulic cylinders, one said cylinder being releasably threadedly fastened on each said open end of said cylinder portion, hydraulic fluid connection means for each said cylinder, and control means whereby hydraulic fluid may be controllably admitted to one or other of said hydraulic cylinders whereby to drive said rack to and fro, and move said drive gear, thereby rotating said column and said boom means.

* * * * *